RE 24996
July 14, 1959     H. J. BUTLER     2,894,607
DISC BRAKES
Filed Feb. 25, 1957     2 Sheets-Sheet 1
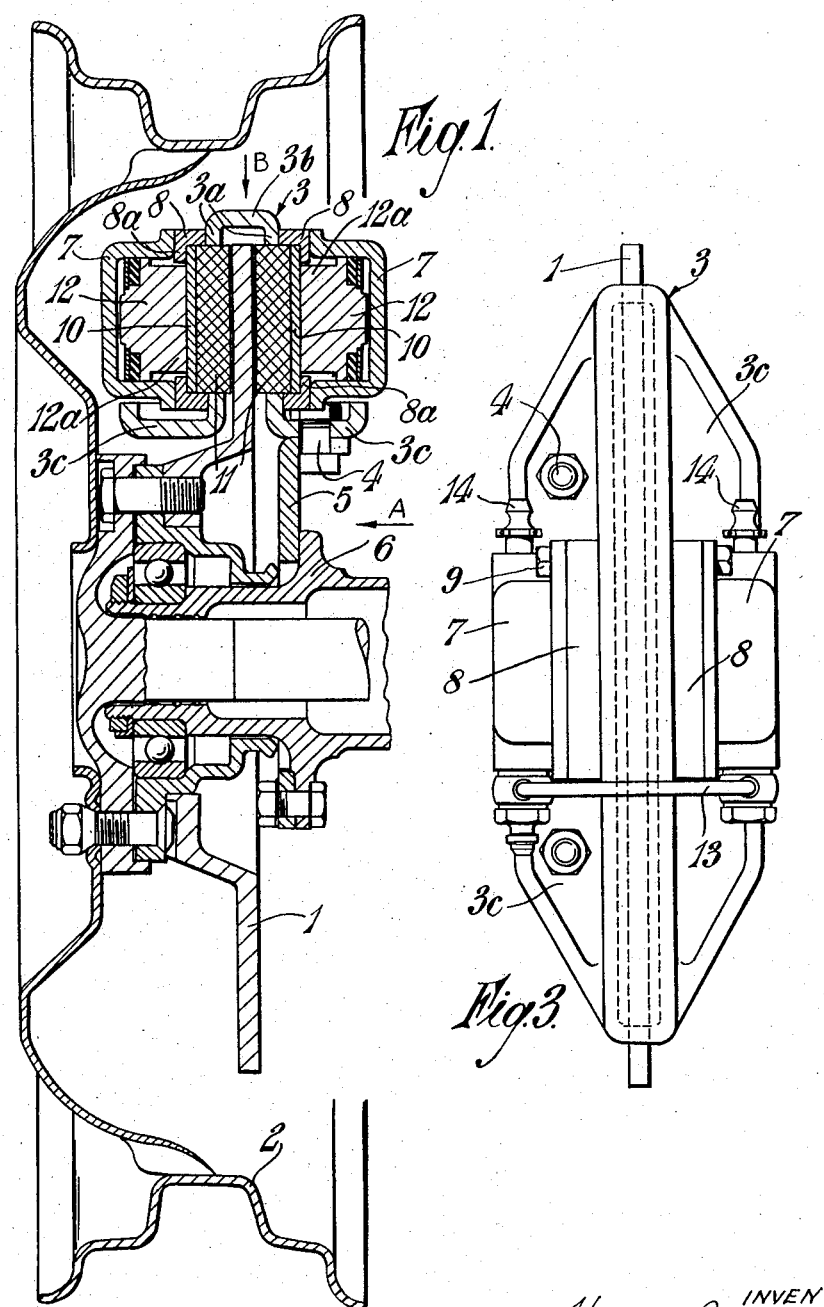
INVENTOR
Henry James Butler
by Benj T. Rauber
Attorney

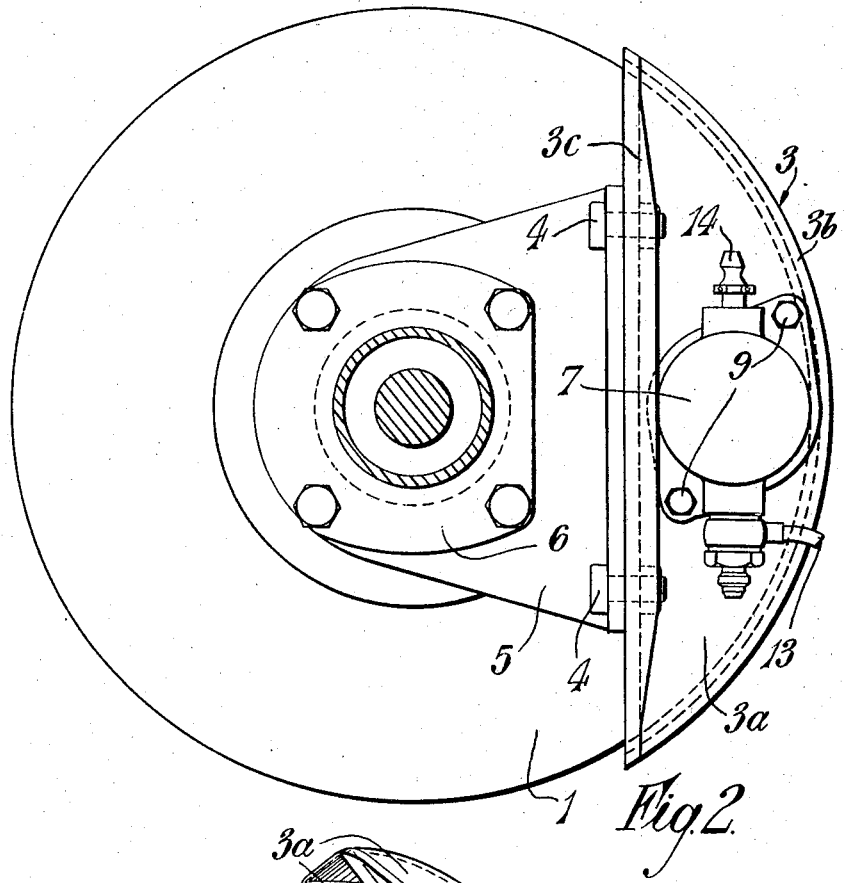
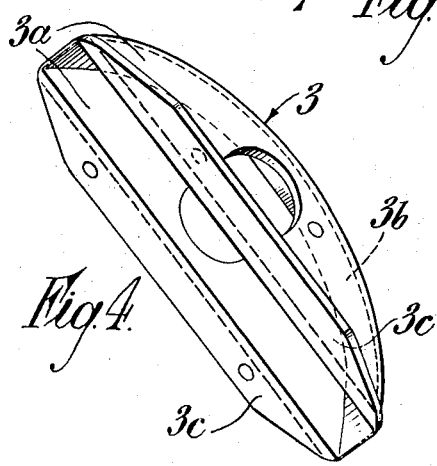

United States Patent Office 2,894,607
Patented July 14, 1959

2,894,607

DISC BRAKES

Henry James Butler, Sutton Coldfield, England, assignor to Dunlop Rubber Company Limited, London, England, a British company Application February 25, 1957, Serial No. 642,110

11 Claims. (Cl. 188—73)

This invention relates to disc brakes of the type comprising a rotatable disc, pads of friction material axially-aligned one on each side of the disc to frictonally engage said disc and a mechanism to effect said engagement, and includes disc brakes of the type described in our pending U.S. specification Serial No. 207,148 filed 22nd January 1951, now Patent No. 2,790,516, which comprises a rotatable disc, axially-aligned friction pads one one each side of the disc and a fluid pressure mechanism on each side of the disc to force said friction pads into frictional contact with the disc.

The friction pads and fluid pressure mechanism are carried by a housing which straddles a periphery of the disc and hitherto this housing has usually been machined from a solid block of metal. This method is expensive and also the housing is heavy, which is undesirable when the brake is for use in a vehicle.

Sheet metal housings of arcuate shape have also been proposed, but these require reinforcing with U-shaped ribs to give them the necessary stiffness. This not only increases the cost of production but increases the radial depth of the housing so that, to incorporate such a brake into a wheel of given size, a smaller disc must be employed, thus reducing the efficiency of the brake.

The object of the present invention is to provide a disc brake construction comprising an improved housing which is robust, light in weight and economical to manufacture.

According to the present invention a disc brake comprises a rotatable disc, a non-rotatable housing straddling a periphery of the disc, pads of friction material to frictionally engage the braking surfaces of the disc and means to effect said frictional engagement, wherein said housing comprises a one-piece pressing or stamping of segmental shape enclosing a portion of the disc and the chordwise edges of said housing are provided with reinforcing flanges.

The housing preferably comprises a pair of segmental radially-extending sides each located adjacent a braking surface of the disc and an integral arcuate portion adjacent the outer periphery of the disc. Said arcuate portion may conveniently be slotted to assist cooling of the disc. The reinforcing members preferably comprise integral outwardly-extending flanges, one of which is used to secure the housing to a non-rotatable part of the wheel assembly.

Preferably both of the two radially-extending sides of the housing are provided centrally with holes through which cylindrical pads of friction material are slidable to frictionaly engage the braking surfaces of the disc. The means to effect said frictional engagement may comprise a lever mechanism actuated by a fluid pressure operated mechanism situated adjacent the outer periphery of the housing. Preferably, however, cylinders are detachably secured to the peripheries of said holes and the friction pads are slidable therein and are urged into frictional contact with the disc by fluid pressure operated plungers working in said cylinders. The cylinders may be provided at one end with annular flanges whereby they may be secured to the housing and they may themselves comprise one-piece pressings or stampings.

The annular disc may be axially slidable within the housing, and in this case only one radially-extending wall of the housing may be provided with a hole through which a pad of friction material is axially slidable under the action of operating means to force the axially slidable disc into engagement with a pad of friction material secured to the other wall of the housing.

In order that the invention may be more fully described, reference is made to the accompanying drawings, of which:

Figure 1 is a section through a wheel and disc brake assembly constructed in accordance with the invention.

Figure 2 is a view of the brake assembly in the direction of the arrow A of Figure 1.

Figure 3 is a view of the brake assembly in the direction of the arrow B of Figure 1.

Figure 4 is a perspective view of the brake housing.

A disc brake constructed in accordance with one embodiment of the present invention comprises an annular disc 1 secured at its inner periphery to rotate with a vehicle wheel 2. Enclosing a part only, of the order of one quarter of the braking surfaces of the disc, is a housing 3 comprising two segmental radially-extending sides 3a and an integral arcuated peripheral portion 3b located adjacent the outer periphery of the disc. The chordwise edges of the housing are each provided with a stiffening flange 3c which extends axially outwardly away from the disc and is further stiffened by being lipped radially-outwardly at its outer edge. The flanges 3c are shaped as shown at Figure 3 to provide the greatest stiffening effect at the center of the chordwise edges of the housing. One of the flanges is provided with a pair of holes whereby the housing is secured by a nut and bolt assembly 4 to a torque plate 5 secured to a non-rotatable part 6 of the wheel axle.

Each segmental radially-extending side of the housing is provided centrally with a circular hole to the periphery of which detachable cylinders 7 are secured, said cylinders thus being axially-aligned one on each side of the disc. Each cylinder is closed at its outer end and flanged at its inner end, said flanges being secured, through an annular, similarly flanged collar 8, to the housing by nut and bolt assemblies 9. The internal diameter of the collar 8 is the same as the diameter of the hole in the housing and the end of the collar remote from the disc is provided with an inwardly-extending annular flange 8a. This flange forms an abutment for a circular pressure plate 10 slidable in said collar and secured to said pressure plate and axially slidable through holes in the collar and the housing is a circular pad of friction material 11, one side thereof being adapted to frictionally engage an adjacent face of the disc.

A piston 12 is fluid-tightly slidable in each cylinder, said piston being provided on one side with an extension 12a to abut the pressure plate 10. The closed outer end of each cylinder is connected by a pipe 13 and are each provided with a fluid pressure connection 14 leading to a source of fluid-pressure, e.g. a master-cylinder (not illustrated).

On pressurizing the system by, e.g. operating the master-cylinder, the two pistons are forced axially inwardly towards the disc, thus forcing the friction pads into frictional contact with the disc to decelerate the wheel. Circumferential movement of the friction pads on braking is prevented by the bearing surface together provided by the collar and the housing.

The housing is preferably a one-piece pressing which is easily fabricated, needs no machining and is light and economical to produce. Owing to its shape it is stiff and robust and needs no further reinforcing members. The cylinders may also be one-piece pressings. Two or more cylinders may be secured to each side of the housing and the friction pads may, e.g. be or arcuate shape and slide in arcuate holes in the housing and collars.

The housing need not necessarily comprise a one-piece pressing; e.g. the chordwise flanges could be welded or otherwise secured to the housing.

Instead of the piston and cylinder mechanism herein illustrated and described, the brake may be operated mechanically, e.g. through a lever mechanism.

Having now described my invention, what I claim is:

1. A disc brake comprising a rotatable disc; a non-rotatable housing straddling a periphery of the disc, said housing comprising a pair of spaced side walls of segmental shape having a chordwise edge, an arcuate wall integrally connecting the arcuate outer edges of said side walls from one end of said chordwise edge to the other end thereof, and a pair of reinforcing ribs one for each said side walls and integral therewith and extending chordwise alongside the chordwise edge of said side walls to define a segmental area between said reinforcement and said arcuate wall; pads of friction material within said segmental area to engage frictionally the braking surfaces of the disc and means mounted on said side walls of said housing within said segmental area to effect said frictional engagement.

2. A disc brake according to claim 1 wherein the radially-extending sides of the housing are provided with axially-aligned holes through which friction pads are axially slidable to frictionally engage opposite sides of the disc.

3. A disc brake according to claim 3 wherein a collar is located at the periphery of each of said holes to provide an increased bearing surface for the pads when the brake is applied.

4. A disc brake according to claim 1 wherein a fluid-pressure operated piston and cylinder mechanism is associated with each of said pads to force them into frictional engagement with the disc.

5. A disc brake according to claim 1 wherein the friction pads are cylindrical and the holes through the housing and collars are circular.

6. The disc brake of claim 1 in which said reinforcing ribs are at the chordwise edge of said spaced side walls.

7. The disc brake of claim 1 in which said reinforcement rib is bowed outwardly from its respective side wall to a greater width midway between the ends of said rib to impart greater stiffness thereto.

8. The disc brake of claim 1 in which said reinforcement rib has a flanged outer edge.

9. The disc brake of claim 1 in which said housing and reinforcement are of stamped sheet metal.

10. The disc brake of claim 1 comprising a torque plate having a flange rigidly secured to said reinforcement rib of one of said side walls.

11. A disc brake comprising a rotatable disc, a non-rotatable housing straddling a periphery of the disc, said housing comprising a pair of spaced side walls of segmental shape and having a chordwise edge and an arcuate wall integrally connecting the arcuate outer edges of said side walls from one end of said chordwise edge to the other end thereof, and a pair of reinforcing ribs one for each said side walls and integral therewith and extending chordwise alongside the chordwise edge of said side walls to define a segmental area between said reinforcement and said arcuate wall, said housing being free of stiffening ribs extending about said arcuate wall and inwardly of said side walls transverse to said chordwise reinforcement, pads of friction material within said segmental area to engage frictionally the braking surfaces of the disc and means mounted on said side walls of said housing within said segmental area to effect said frictional engagement.

References Cited in the file of this patent

FOREIGN PATENTS

| | | |
|---|---|---|
| 1,101,244 | France | Oct. 4, 1955 |
| 706,050 | Great Britain | Mar. 24, 1954 |
| 717,350 | Great Britain | Oct. 27, 1954 |